March 16, 1926. 1,576,633
A. DIX
STRAIN METER
Filed June 6, 1925 2 Sheets-Sheet 1
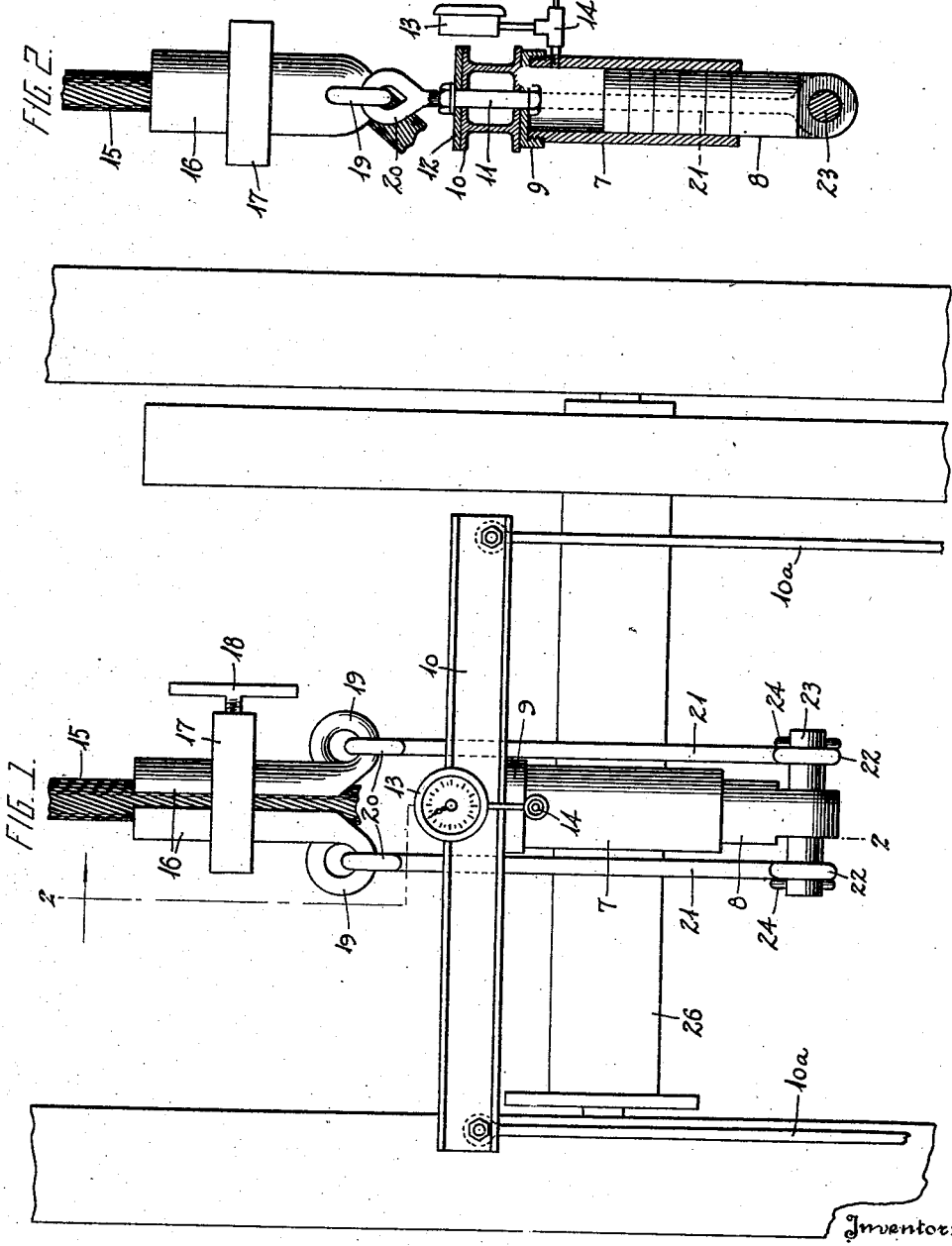
Inventor:
Arthur Dix,
By Norman E. Miller
Attorney.

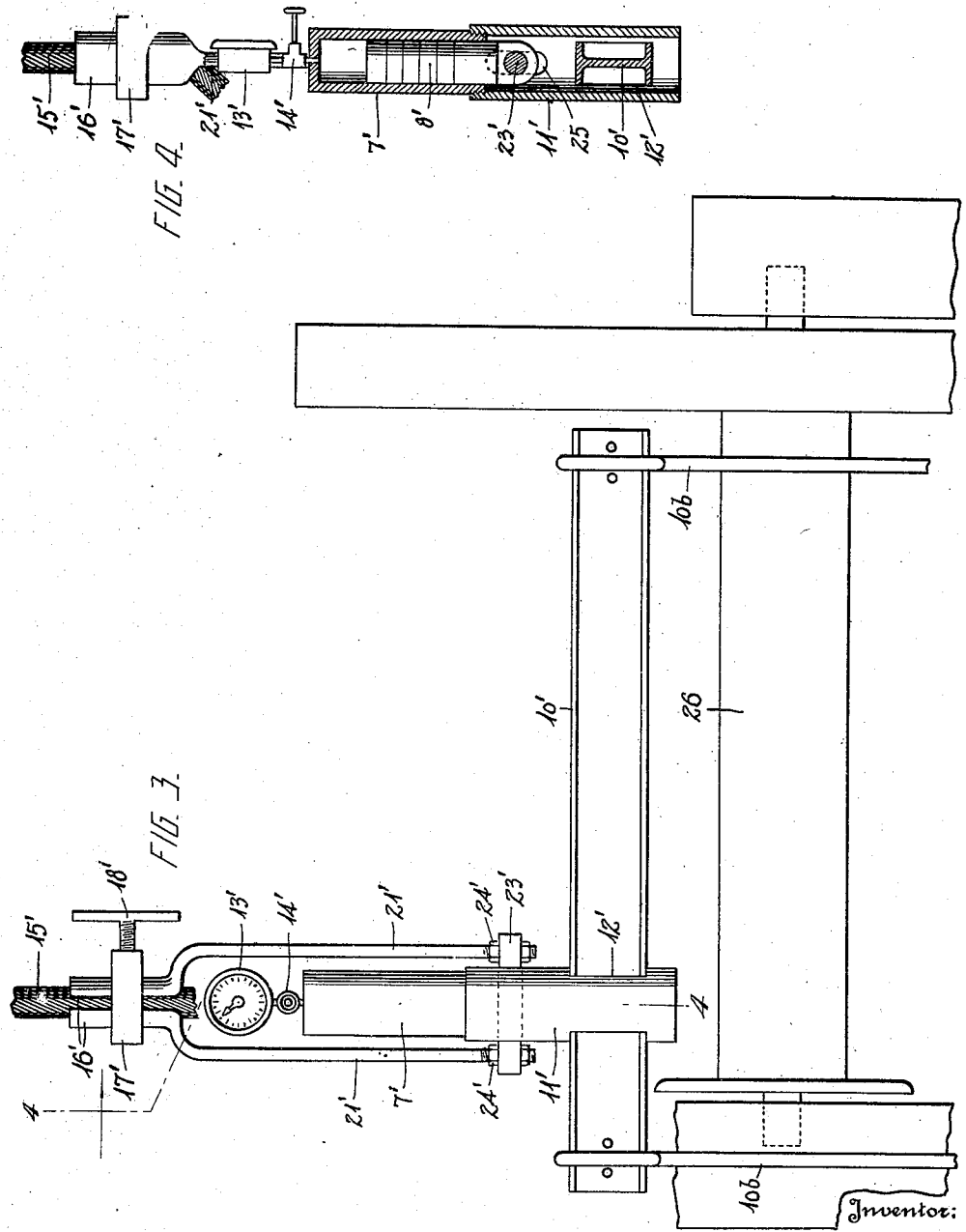

Patented Mar. 16, 1926.

1,576,633

UNITED STATES PATENT OFFICE.

ARTHUR DIX, OF TAFT, CALIFORNIA.

STRAIN METER.

Application filed June 6, 1925. Serial No. 35,402.

*To all whom it may concern:*

Be it known that I, ARTHUR DIX, a citizen of the United States, residing at Taft, in the county of Kern and State of California, have invented certain new and useful Improvements in Strain Meters, of which the following is a specification, reference being had therein to the accompanying drawing.

The present invention relates to strain or drilling meters, and aims to provide a novel and improved device for use on well drilling rigs and adapted for connection with the drilling cable in order to indicate at all times the weight of the bit or drill pipe, and also useful for indicating when a portion of the drill pipe is twisted off or when a bit or tool is caught when fishing for game.

Another object of the invention is the provision of strain indicating means in combination with novel means for mounting said means and connecting same with the drilling cable, whereby the device may be readily installed on a drilling rig and will efficiently serve its purpose.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is an elevation of one form of strain meter as installed on a drilling rig.

Fig. 2 is a section on the line 2—2 of Fig. 1.

Fig. 3 is an elevation of a modified construction of strain meter as applied to a drilling rig.

Fig. 4 is a section on the line 4—4 of Fig. 3.

A hydraulic pressure indicator is used as shown, reference being had to Figs. 1 and 2. Thus, a vertical cylinder 7 (preferably filled with oil) is provided in which a plunger 8 reciprocates, and said plunger projects from the lower end of the cylinder and is provided with suitable packing means. The upper end of the cylinder 7 is screw-threaded or otherwise secured in a head or cap 9 which seats upwardly against a yoke 10 that is anchored to the base or foundation of the drilling rig, by means of rods 10ª. The head 9 is secured to the yoke 10 by means of a bolt 11 engaging through said head and bearing on a washer or plate 12 seating on the yoke 10.

A pressure gage 13 is connected through a valve 14 with the cylinder 7, and the pointer of the gage will indicate in pounds or other unit the amount of strain on the drilling cable 15 with which the plunger 8 is connected. However, it will be apparent that other means may be used, as well known in the art, for indicating the strain by the upward movement of the plunger 8 acting against a yieldable resisting medium.

In order to connect the plunger 8 with the drilling cable 15 a clamp is provided including the jaws 16 between which the cable passes, and a band 17 surrounds said jaws and carries a set screw 18 which may be tightened for clamping the jaws on the cable. The jaws 16 have eyes 19 at their lower ends engaged by eyes or loops 20 on the upper ends of links or rods 21 disposed at opposite sides of the cylinder 7 and passing slidably through or across the yoke 10. The lower ends of the links 21 have eyes or loops 22 embracing a transverse pin 23 that extends through the lower end portion of the plunger 8, and the links 21 are retained on the pin 23 by means of cotter pins or other retaining elements 24.

By attaching the device to the yoke 10, the device may be positioned in front of or adjacent to the calf wheel drum 26 on which the surplus drilling cable is wound (not shown), it being understood that the cable 15 extends from the jaws 16 of the cable clamp to and is wound upon the drum 26 as usual. The device is used for anchoring the dead line of the drilling rig, with the strain indicator disposed between the cable clamp and yoke or member 10 which is rigidly connected with the base or frame of the rig, so that the strain on the cable 15 is transmitted by the cable clamp and links 21 to the plunger 8, so as to be indicated by the gage 13. Therefore, the gage 13 will indicate at all times the weight of the drill bit. The attendant may note from the gage 13, by a decrease in the weight indication, when a portion of a drill pipe is twisted off, and, in fishing for a lost bit or tool, the gage will indicate when such bit or tool has been caught.

Figs. 3 and 4 illustrate a modification. The cylinder 7' is disposed above the yoke 10' and is connected thereto by means of a sleeve 11' which has its upper end screw-threaded or otherwise secured on the lower end portion of the cylinder 7', with said sleeve extending downwardly from the cylinder. The sleeve has openings 12' receiving the yoke 10', whereby the sleeve connects the cylinder with the yoke. Said yoke is anchored to the base or foundation of the rigging by the rods 10^b. The pin 23' which engages through the lower end portion of the plunger 8' works in longitudinal slots 25 with which the sleeve 11' is provided between the openings 12' and cylinder 7'.

The jaws 16' of the cable clamp are integral with the upper terminals of the rods or links 21' and are offset over the cylinder 7'. A band 17' surrounds said jaws and carries the set screws 18' for clamping said jaws on the drilling cable 15'. The pressure gage 13' is located above the cylinder 7' under the cable clamp between the links 21', with a valve 14' between said gage and upper end of the cylinder. The lower terminals of the links or rod 21' extend through the pin 23' and have nuts 24' screw-threaded thereon to secure said links to the pin 23'.

The cylinder 7' may be adjusted on the yoke or bar 10' by sliding the sleeve 11', and this enables the device to be positioned according to the change in position of the cable 15' when wound on the drum 26. The same result is obtained with the device shown in Figs. 1 and 2 by loosening the bolt 11 so that the cylinder 7 can be slid along the yoke or bars 10. Thus, as the cable is wound upon or unwound from the drum, it is possible to slide or shift the device parallel to the axis of the drum. Having thus described the invention, what is claimed as new is:—

1. A strain meter comprising strain indicating means including a cylinder and a plunger working in the cylinder and projecting downwardly therefrom, means for connecting said cylinder with the frame or base of a drilling rig, a clamp above the cylinder for engaging the drilling cable of the rig; and means connecting said clamp and plunger.

2. A strain meter comprising a strain indicator including a cylinder and a plunger working in the cylinder and projecting from the lower end thereof, means for connecting the cylinder with the frame or base of a drilling rig, a cable clamp above the cylinder to engage the drilling cable of the rig; and links at opposite sides of the cylinder connected at their upper ends with said clamp and at their lower ends with said plunger.

3. A strain meter comprising a strain indicator having a cylinder and a plunger working in the cylinder and projecting from the lower end thereof, a yoke, rods connected with the yoke for anchoring same to the frame or base of a drilling rig, means securing said cylinder to said yoke, a cable clamp above said cylinder and yoke to engage the drilling cable of the rig, and means connecting said clamp and plunger.

In testimony whereof I hereunto affix my signature.

ARTHUR DIX.